US005186151A

United States Patent [19]

Schwerdt et al.

[11] Patent Number: 5,186,151

[45] Date of Patent: Feb. 16, 1993

[54] DEVICE FOR STEPPING UP OR TRANSMITTING FORCES AND STROKES

[75] Inventors: Paul Schwerdt, Freudenstadt; Dieter Dörrie, Stuttgart; Karl Kirschenhofer, Ulm, all of Fed. Rep. of Germany

[73] Assignee: Mercedes-Benz AG, Fed. Rep. of Germany

[21] Appl. No.: 897,934

[22] Filed: Jun. 15, 1992

[30] Foreign Application Priority Data

Jun. 13, 1991 [DE] Fed. Rep. of Germany ....... 4119467

[51] Int. Cl.[5] ....................... F02M 37/04; F16K 31/12

[52] U.S. Cl. .................................... 123/506; 123/498; 123/467; 251/129.19; 251/54

[58] Field of Search ............... 123/458, 506, 467, 498; 251/129.19, 129.02, 54, 129.01

[56] References Cited

U.S. PATENT DOCUMENTS

| | | | |
|---|---|---|---|
| 2,421,810 | 6/1947 | Simpson | 251/54 |
| 2,457,739 | 12/1948 | Sherrill | 251/54 |
| 3,529,165 | 7/1967 | Lang | 251/54 |
| 4,624,233 | 11/1986 | Phillips | 123/506 |
| 4,660,523 | 4/1987 | Brauer | 123/498 |
| 4,753,212 | 6/1988 | Miyaki | 123/506 |
| 4,782,807 | 11/1988 | Takahashi | 123/498 |
| 4,794,890 | 1/1989 | Richeson | 251/54 |
| 4,838,232 | 6/1989 | Wich | 123/506 |
| 4,838,233 | 6/1989 | Hayashi | 123/498 |
| 4,898,434 | 2/1990 | Kohno | 251/129.19 |

FOREIGN PATENT DOCUMENTS

| | | |
|---|---|---|
| 1013139 | 9/1958 | Fed. Rep. of Germany . |
| 3742241 | 1/1990 | Fed. Rep. of Germany . |
| 3916539 | 11/1990 | Fed. Rep. of Germany . |
| 3600140 | 4/1991 | Fed. Rep. of Germany . |

*Primary Examiner*—Carl S. Miller

*Attorney, Agent, or Firm*—Evenson, Wands, Edwards, Lenahan & McKeown

[57] ABSTRACT

A device works according to the displacement principle, i.e., at least two displacers are provided in a common displacer working chamber or in displacer working chambers communicating with one another, and are drivingly coupled together by a pressure transmission medium. Elastomer material is disposed as the pressure transmission medium, at least in the region of one displacer.

3 Claims, 3 Drawing Sheets

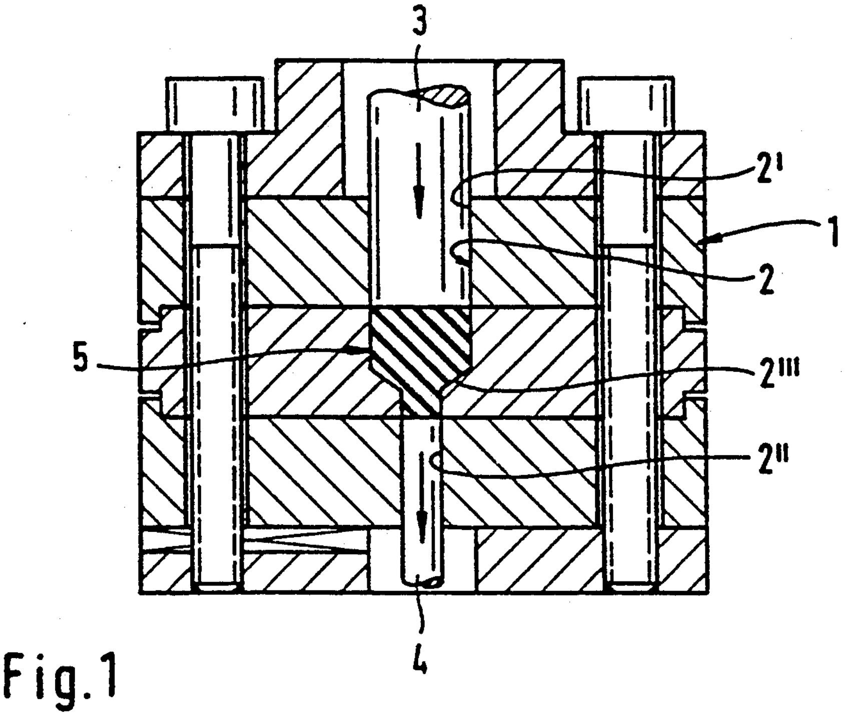
Fig.1
Fig. 2
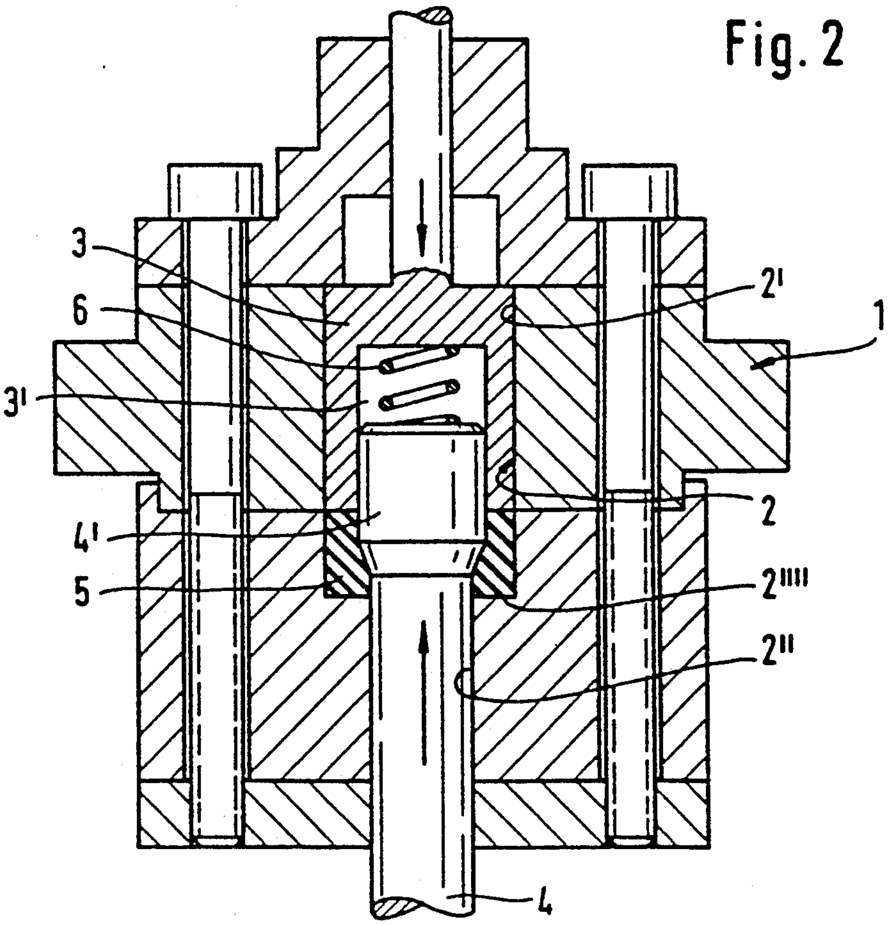

DEVICE FOR STEPPING UP OR TRANSMITTING FORCES AND STROKES

BACKGROUND AND SUMMARY OF THE INVENTION

The present invention relates to a device working on the displacement principle for stepping up or transmitting forces and strokes, comprising a displacer on the input side which is actuated by a piezoelectric element and has a relatively larger cross-section, and also a displacer on the output side which has a relatively smaller cross-section, and a displacer working chamber common to the two displacers and filled with a pressure transmission medium which is formed, at least in the region of one displacer, by an elastomer sealingly closing the side on which said displacer is situated in relation to the side on which the other displacer is situated.

A corresponding device is shown in German Offenlegungsschrift 39 16 539 wherein the displacer working chamber between two displacers may be completely filled with an elastomer serving as a pressure transmission medium. At the same time, the elastomer is able to form a leakproof barrier between the displacers.

German Patent Specification 10 13 139 a similar device shows a displacer on the input side which acts on an elastomer enclosed in a cavity and, on its side remote from the displacer on the input side, bounds a liquid chamber, which in turn is connected by a pipe to a hydraulic unit. By appropriate movement of the displacer on the input side, the liquid chamber can be enlarged or reduced in size so that liquid is displaced from the chamber or received by the chamber.

It is also known in principle, as seen in German Patent Specification No. 36 00 140, that superplastic alloys can be used as pressure transmission medium.

Finally, German Patent Specification No. 37 42 241 shows a piezoelectrically actuated control valve for controlling fuel injection in an internal combustion engine. The relatively short stroke of a piezoelectric element is stepped up hydraulically to produce the relatively long stroke of the valve member of the control valve.

An object underlying the present invention is the provision of a constructionally simple way of piezoelectrically actuating the control valve of a fuel injection system.

This object has been achieved according to the present invention with the aid of a device of the type indicated at the outset, in which the displacer on the output side is drivingly coupled to the valve member of a control valve in a fuel injection system of an internal combustion engine, and the elastomer disposed on the displacer on the output side forms a leakproof barrier between a pipe system carrying fuel on the side where the displacer on the output side is disposed and the piezoelectric element, and also forms a fastening for the displacer on the output side.

In the present invention, the elastomer has multiple functions, since, on one hand, it serves as a pressure transmission medium and, on the other hand, it acts as a screen for the piezoelectric element in relation to the fuel system. Consequently, it is possible to produce a construction similar to one for conventional hydraulic force and stroke transmission between a piezoelectric element and the valve member of the control valve; at the same time, however, the comparatively expensive sealing arrangement necessary for hydraulic force and stroke transmission, which have to keep the fuel away from the piezoelectric element in order to avoid breakdowns, are dispensed with. Finally, the elastomer also serves to fasten the displacer on the output side, particularly during its installation.

In connection with further features of the present invention, for example, the usually non-reproducible position of rest of the piezoelectric element can be compensated for hydraulically.

BRIEF DESCRIPTION OF THE DRAWINGS

These and other objects, features and advantages of the present invention will become more apparent from the following detailed description of currently preferred embodiments when taken in conjunction with the accompanying drawings wherein:

FIG. 1 is a sectional view through a device working on the displacement principle according to the present invention for stepping up or transmitting forces and strokes, wherein two displacers having different cross-sections are driving coupled together, by a displacer working chamber filled with elastomer, such that the two displacers have stroke movements in the same direction;

FIG. 2 is a sectional view similar to FIG. 1, but showing an embodiment of the present invention in which stroke movements on the input and output sides are in opposite directions;

DETAILED DESCRIPTION OF THE DRAWINGS

Figure 3:
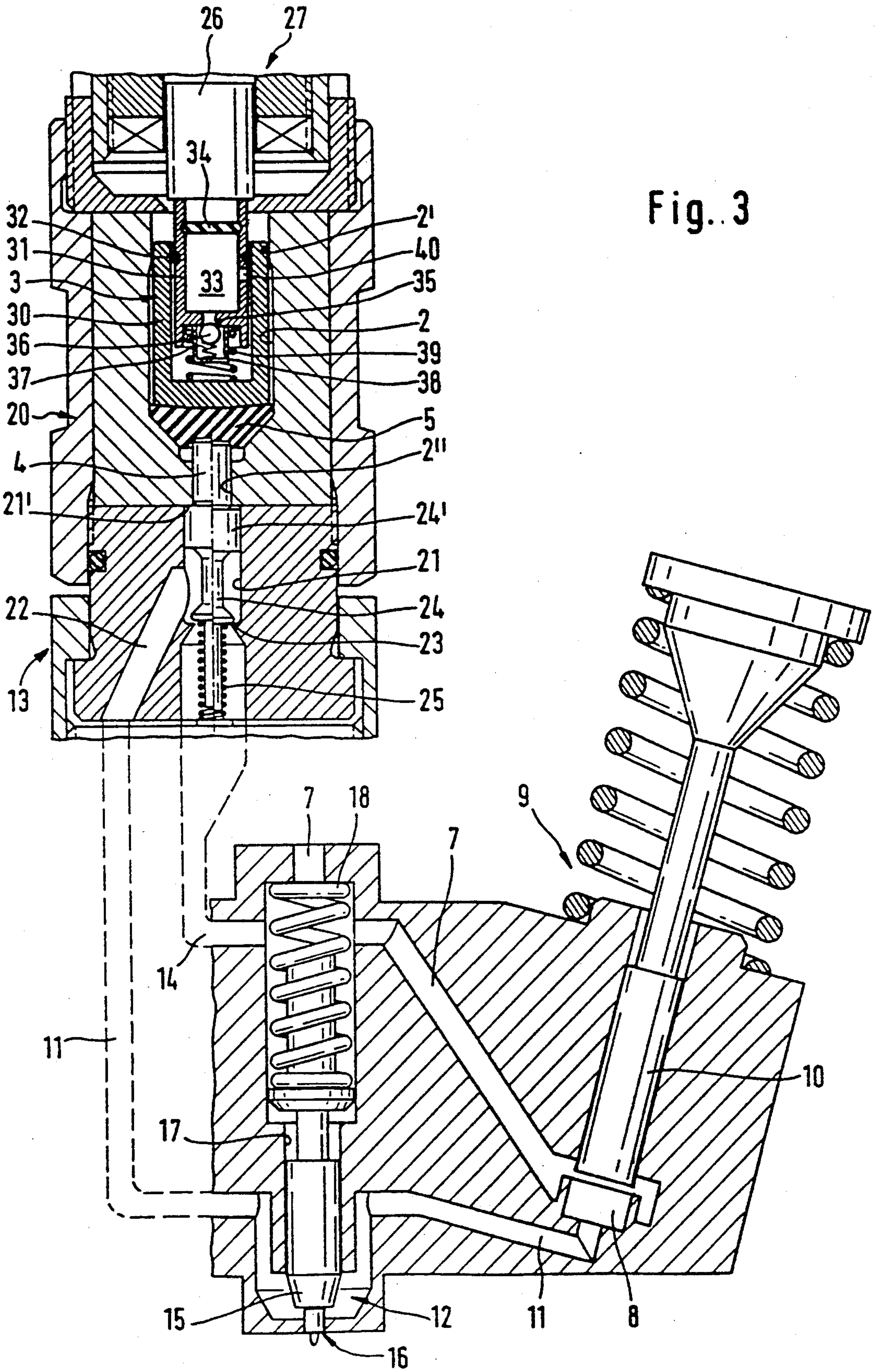
FIG. 3 is a sectional view of a fuel injection device for internal combustion engines, in which the present invention is utilized for stepping-up of the stroke of a piezoelectric actuating member for the actuation of a control valve.

In the stroke step-up device shown in FIG. 1, a casing 1 is provided with a bore 2, of which a portion 2' of the bore 2 has a large diameter and a portion 2'' of the bore 2 has a smaller diameter. A conical transition zone 2''' is located between the two bore portions 2' and 2''.

In the portion 2' of the bore 2, a first plunger 3 whose cross-section is adapted to the diameter of the portion 2' is axially slidably arranged. The guiding of the plunger 3 may be made relatively loose, i.e. the annular gap formed between the wall of the portion 2' of the bore 2 and the outer periphery of the plunger 3 may have a relatively large cross-section.

In the portion 2'' of the bore 2, a second plunger 4 is slidably guided. Likewise, the guiding of the plunger 4 may be similar to that described with reference to the plunger 3, i.e., relatively loose.

An elastomer cushion 5 is disposed inside the transition zone 2''' and also in adjoining regions of the portions 2' and 2'' of the bore 2, between mutually facing end faces of the plungers 3 and 4. The elastomer cushion 5 is vacuum-vulcanized and, as illustrated, fills the space available between the plungers 3 and 4 in the bore 2.

The arrangement illustrated in FIG. 1 operates in the following manner.

When the plunger 3 shown at the top in FIG. 1 is stressed downwardly against the elastomer cushion 5 and is moved downwardly by a limited stroke, the elastomer cushion 5 is elastically deformed so that, depending on the amount displaced by the plunger 3, additional elastomer material is forced into the portion 2″ of the bore 2 and correspondingly moves the plunger 4 downwardly. This involves a stepped-up stroke; in other words, the stroke of the plunger 4 is increased relative to the stroke of the plunger 3 by a factor which corresponds to the ratio between the cross-sections 2′ and 2″ of the bore 2.

If the plunger 4 is moved upwards as the driving member, the plunger 3 is also displaced upwards as the driven member. In this case however the stroke is stepped down, that is to say the stroke of the plunger 3 is smaller than the stroke of the plunger 4 by a factor which once again is determined by the ratio between the cross-sections of the portions 2′ and 2″.

In addition, a stepping-up or stepping-down of force is also achieved between the plungers 3, 4. If both plungers 3, 4 are moved towards one another by external forces (that is to say the plunger 3 is moved downwards and the plunger 4 upwards), equilibrium is achieved when the force acting on the plunger 3 is greater than the force acting on the plunger 4 by a factor which once again corresponds to the ratio of the cross-sections of the portions 2′ and 2″ of the bore 2.

As long as the strokes of the plungers 3 or 4 are short enough for the elasticity range of the elastomer cushion 5 not to be exceeded, the elastomer cushion 5 thus behaves similar to a hydraulic medium, but with the substantial and advantageous difference that the elastomer material is practically unable to penetrate into the gaps remaining between the peripheral surfaces of the plungers 3 and 4 and the walls of the portions 2′ and 2″ of the bore 2. In contrast to the use of a hydraulic medium instead of the elastomer cushion 5, it is therefore unnecessary to seal these gaps.

Furthermore, it is advantageous that the elastomer cushion 5, because of its elasticity, attempts to force the plungers 3 and 4 into respective defined starting positions or to hold them therein. No other action is required to predetermine the starting position.

The embodiment illustrated in FIG. 2 differs from the embodiment of FIG. 1 in that the bore 2 inside the casing 1 has an annular step-shaped transition 2″″ between its bore portions 2′ and 2″. The plunger 3 guided in the portion 2′ of the bore 2 has a circular annular cross-section, i.e. an axial bore 3′ is formed in the plunger 3 and is open towards the portion 2″ of the bore 2, with its cross-section being larger than the cross-section of the portion 2″ of the bore 2. The plunger 4 guided in the portion 2″ widens conically above the step-shaped transition 2″″ of the bore 2 and, by a correspondingly widened piston-like end 4′, is slidably guided in the axial bore 3′ of the other plunger 3. The annular space remaining axially between the annular step-shaped transition 2″″ of the bore 2 and the facing annular end face of the plunger 3 inside the bore 2 in the casing 1 is filled with a correspondingly annular elastomer cushion 5. A coil compression spring 6 may be clamped between an end surface, which in FIG. 2 closes the axial bore 3′ of the plunger 3 towards the top, and the facing end face of the piston-like end 4′ of the plunger 4.

The arrangement illustrated in FIG. 2 operates in the following manner. If the plunger 3 moves in the downward direction towards the elastomer cushion 5, the plunger 4 is moved upwards in a stepped-up stroke, that is to say the lengths of the strokes behave like the ratio of the cross-sections of the radial annular surfaces which are formed, on one hand, between the outer periphery of the piston-like end 4′ of the plunger 4 or the inner periphery of the axial bore 3′ of the plunger 3 and the inner wall of the portion 2′ of the bore 2, and, on the other hand, between the outer periphery of the piston-like end 4′ of the plunger 4 and the outer periphery of that part of the plunger 4 which is guided in the portion 2″ of the bore 2.

If the plunger 4 is pulled downwards by an external force, the plunger 3 is forced upwards. The stroke is stepped down in accordance with the ratio between the previously indicated annular surfaces.

In addition, there is once again a stepping-up or stepping-down of the force; in other words, if the plungers 3, 4 are forced by external forces in the downward direction, equilibrium will occur when the ratio between the force acting on the plunger 3 and the force acting on the plunger 4 corresponds to the reciprocal value of the ratio of the cross-sectional difference, which exists between the cross-section of the portion 2′ of the bore 2 and the piston-like end 4′ of the plunger 4, to the cross-sectional difference existing between the cross-section of the piston-like end 4′ of the plunger 4 and that part of the plunger 4 which is guided in the portion 2″ of the bore 2.

Whereas in the embodiment shown in FIG. 1 the directions of the strokes of the plunger 3 or 4 driving at a given moment and of the plunger 4 or 3 which is driven at that moment are the same, the directions of the strokes are thus reversed in the example shown in FIG. 2. The same advantages as were described above in connection with the embodiment shown in FIG. 1 are also applicable to the embodiment shown in FIG. 2.

In the fuel injection system illustrated in FIG. 3, fuel passes via a supply pipe 7 to a plunger working chamber 8 of an injection pump 9, whose plunger 10 in its downwards stroke closes the connection between the region of the plunger working chamber 8 shown at the bottom in FIG. 3 and the supply pipe 7 and thus pushes fuel out of the bottom region of the plunger working chamber 8 into a pipe 11 which starts therefrom and leads, via an injection valve 12, to a control valve 13. The valve 13 controls, by opening and closing, a connection between the pipe 11 and a return pipe 14 leading to the supply pipe 7.

The injection valve 12 has a piston-like closure member 15 which, in the illustrated closed position, closes, by way of a pin-like extension, an injection nozzle 16 connected to the pipe 11. The closure member 15 is arranged like a piston guided in a bore 17 and is so constructed that the hydraulic pressure at the injection nozzle 16 or in the pipe 11 exerts a force in the opening direction on the closure member 15 and thus attempts to lift the closure member 15 against the force of a return spring 18.

As long as the control valve 13 is open and accordingly the pipe and the return pipe 14 are connected to one another, the hydraulic pressure in the pipe 11 always remains so low that the return spring 18 holds the closure member 15 in the illustrated closed position. If the control valve 13 is now closed, however, the hydraulic pressure in the pipe 11 rises sharply while the injection pump 9 is working, with the consequence that the closure member 15 is lifted into its open position and fuel is expelled through the injection nozzle 16.

In basically known manner, the control valve 13 has a multipart casing 20 with a multistepped or conically widened axial bore 21, of which the region shown at the bottom in FIG. 3 forms a part of the return pipe 14. An oblique bore 22, which forms part of the pipe 11, leads from the side into the axial bore 21. A seat 23 is formed between the point where the oblique bore 22 leads into the axial bore 21 and the part of the latter which is at the bottom in FIG. 3. This seat cooperates with a valve member 24 which, by its piston-like portion 24', is slidably guided in the axial bore 21 above the point where the oblique bore 22 leads into the latter, and which, in its opening position to which the valve member 24 is forced by a spring 25, strikes against an annular step-shaped constriction 21' of the axial bore 21.

The axial bore 21 is terminated above the constriction 21' by the coaxial bore 2 which is constructed in the same manner as shown in FIG. 1. Here once again, the plunger 4 is disposed slidably in the bottom portion 2" of the bore 2, with its lower end face in FIG. 3 laying on the facing end face of the valve member 24. In the top portion 2' of the bore 2, the plunger 3 is slidably guided and is drivingly coupled to the above-mentioned plunger 4 by the previously described elastomer cushion 5.

The plunger 3 is acted on by a ram-like actuating member 26 of a piezoelectric actuating element 27. If a current is passed through the element 27, the ram-like actuating member 26 is moved downwardly and accordingly forces the plunger 3 downwardly. Consequently, the plunger 4 is moved in the downward direction with a stroke lengthened in accordance with the stroke step-up ratio and moves the valve member 24 to its closed position against the force of the spring 25. If the electric current applied to the piezoelectric element 27 is switched off, the piezoelectric element 27 moves to its position of rest through its inherent dynamic action, and the spring 25 pushes the valve member 24 back to its opening position, with the plunger 4 being pushed upwardly and accordingly moving the plunger 3 upwardly in a stroke reduced in relation to the plunger 4.

The stroke step-up action between the plungers 3 and 4 takes into account the fact that the piezoelectric element 27 or its actuating member 26 is able to make only relatively short strokes when electrically energized or deenergized, whereas the valve member 24 has a relatively long opening or closing stroke.

In the form utilized as described above, the arrangement according to the present invention, provided with the elastomer cushion 5, offers considerable advantages. During the installation of the control valve 13, the elastomer cushion 5 can hold the plunger 4, and optionally also the plunger 3, in a starting position. In addition, the elastomer cushion forms a leakproof barrier between the fuel-carrying pipe system and the piezoelectric element 27. Moreover, it is advantageous that the pressure transmission medium formed by the elastomer cushion 5 cannot pass out between the plungers 3 and 4.

Piezoelectric actuating units have no accurately reproducible position of rest. On the contrary, the position of rest assumed when the electric current is switched off fluctuates around a middle position of rest because of hysteresis effects and thermal expansions. The ram-like actuating member 26 accordingly also has no accurately reproducible position of rest. In order to compensate for the fluctuations of the position of rest, the plunger 3 is constructed in a manner known per se as a compensating element varying in length.

The plunger 3 has an outer part 30 which is open at the top and in which a cylinder-shaped inner part 31 is slidably guided in a piston-like manner. This inner part 31 projects upward slightly out of the outer part 30. In the region of the top end of the outer part 30 shown in FIG. 3, the gap between the outer periphery of the inner part 31 and the inner periphery of the outer part is sealed by a sealing ring 32. An axial bore 33 is provided inside the inner part 31 and extends through the entire length of the inner part 31 and is closed at the top end of the inner part 31 by an elastically resilient end surface 34 or by an elastically resilient seal. A narrowed bottom region of the axial bore 33 forms a seat 35 cooperating with a valve ball 36 which is forced from below against the seat 35, into its closed position, by a valve spring 37. The valve spring 37 is supported on a spring cage 38 which, in turn, is stressed from below against the inner part 31 by a coil compression spring 39 supported on the bottom end of the outer part 30. The stressing force of the coil compression spring 39 is weaker than the stressing force of the opening spring 25 associated with the valve member 24 of the control valve 13.

The interior space formed above the seat 35 inside the inner part 31 is connected by a transverse bore 40, which extends through the peripheral wall of the inner part 31, and, by the gap space between the outer part 30 and the inner part 31, to the space remaining in the outer part beneath the underside of the inner part 31. The cross-section of the gap space is of such dimensions that, in cooperation with a hydraulic oil filling said spaces, a distinctly throttled connection is made.

The plunger 3 illustrated works as follows. As soon as the ram-like actuating member 26 makes a downward stroke, the inner part 31 is forced downwardly, while the outer part 30 is also forced downwardly because, in this operating state, the valve ball 36 remains in the closed position. The valve closure member 24 of the control valve 13 can accordingly be moved to its closed position.

The actuating member 26 of the piezoelectric element 27 may thereupon assume a position of rest which has been displaced relatively far upwardly and lays above the position of rest previously assumed before the downward stroke. In this situation, the plunger 3 has available, a space of relatively great axial length between the upper side of the elastomer cushion 5 and the facing underside of the actuating member 26, as soon as the valve member 24 of the control valve 13 has reached its end position in which it lays against the constriction 21' of the axial bore 21. The plunger 3 will correspondingly expand because the respective outer and inner parts 30 and 31 are pushed apart by the force of the coil compression spring 39, so that the valve ball 36 is lifted from its seat and hydraulic medium overflows from the space above the valve seat 35 into the space below the seat 35. At the same time, the elastic end surface 34 is deformed correspondingly. If thereupon the piezoelectric element is again energized, the plunger 3 can transmit its actuating stroke in the downward direction, because in this operating state the valve ball 36 resumes its closed position and prevents the inner part 31 from making a quick insertion movement into the outer part 30.

After the electric current has been switched off, the actuating member 26 of the piezoelectric element 27 may thereupon assume a position of rest which lies below the position of rest previously assumed before the actuating stroke. Since the plunger 3 at first still has a relatively great length, the spring 25 cannot at first push the valve member 24 completely into its opened end position in which the portion 24' of the valve member 24 strikes against the constriction 21' of the axial bore 21. The plunger 3 is therefore at first stressed by the spring 25. This stress, which is greater than the stress of the coil compression spring 39, has the effect of displacing the hydraulic medium out of the space below the seat 35 through the gap between the inner and outer parts 31, 30 and through the transverse bore 40 back into the space above the seat 35. The elastic end surface 34 is, in turn, correspondingly deformed, and the plunger 3 is shortened until the valve member 24 of the control valve 13 has reached its end position at the constriction 21' of the axial bore 21.

Figure 4:
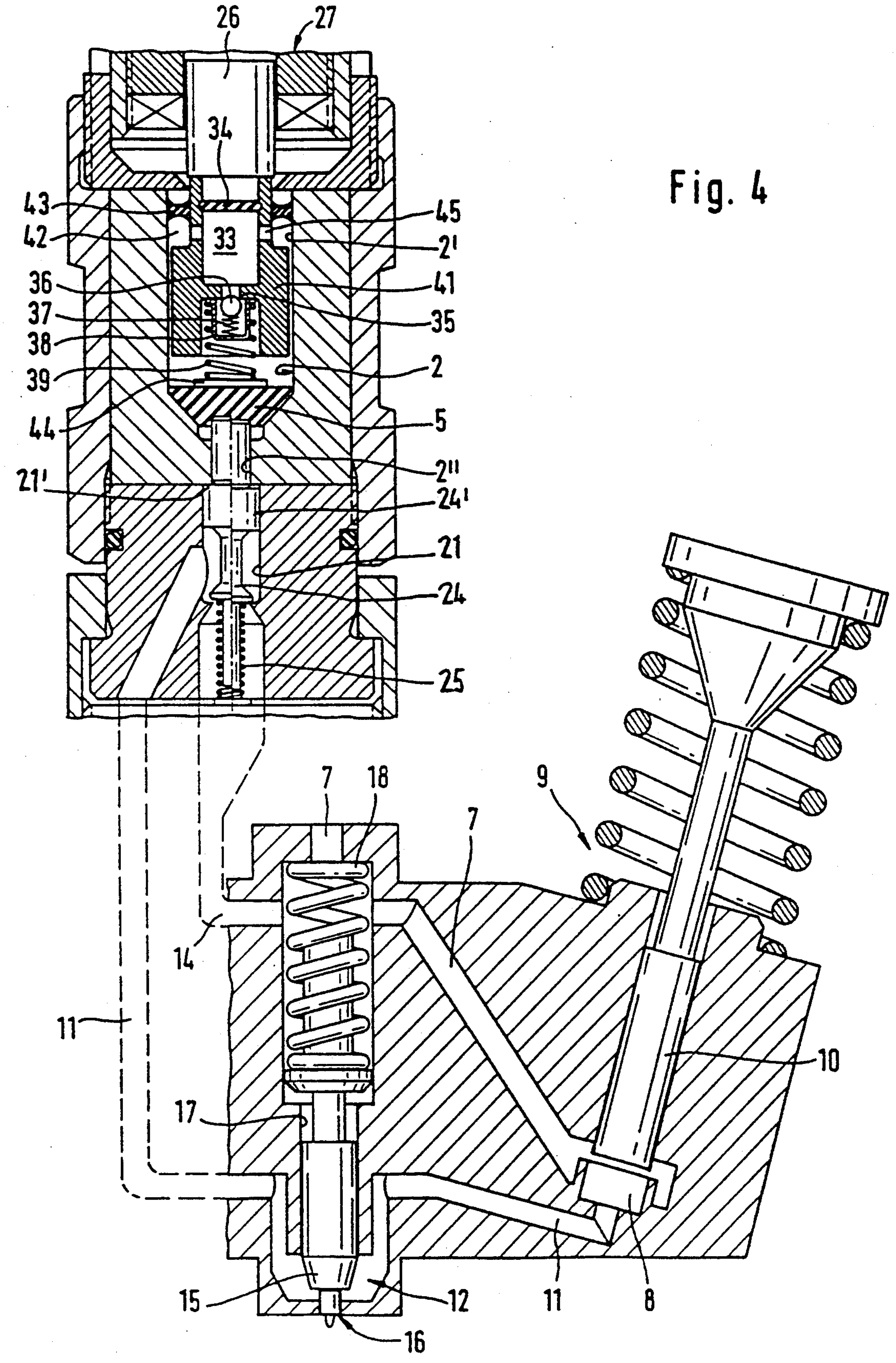
FIG. 4 is a sectional view similar to FIG. 3 but showing another embodiment.

FIG. 4 shows a modified construction for compensation of the variable positions of rest of the actuating member 26 of the piezoelectric element 27. Specifically, a piston 41 is slidably disposed inside the portion 2' of the bore 2 and bears, by its top end, against the actuating member 26. The piston 41 is in the form of a hollow body, i.e. it has a bore 33 which passes axially therethrough and which, at the top end of the piston 41, is closed by the elastic end surface 34. In addition, the top end of the piston 41 is narrowed in step form such that, between the narrowed end of the piston 41 and the inner wall of the portion 2' of the bore 2, an annular space 42 is formed. The space 42 is closed at the top by an annular resilient end member 43, e.g. an elastomer diaphragm. Axial bore 33 is narrowed at the bottom end of the piston 41 to form the seat 35 which, in turn, cooperates with the valve ball 36 forced by the valve spring 37 into its closed position. The valve spring 37 is supported on the spring cage 38 which, in turn, is forced by the coil compression spring 39 against the underside of the piston 41. The coil compression spring 39 is supported on a plate 44 which lays on the upper side of the elastomer cushion 5 or is vulcanized to or in the elastomer cushion 5. The space remaining between the elastomer cushion 5 and the underside of the piston 41 and filled with hydraulic medium is connected to the interior of the piston 41 above the seat 35 by way of the gap acting as a throttle and formed between the inner wall of the portion 2' of the bore 2 and the peripheral wall of the piston 41, and by way of openings 45 which extend through the annular space 42 and the peripheral wall of the piston 41 below the end member 43 and the lid 34.

The embodiment illustrated works in the following way. If the piezoelectric element 27 is energized, its actuating member 26 pushes the piston 41 in the downward direction. This actuating stroke is transmitted by the piston 41 to the elastomer cushion 5 by way of the hydraulic medium enclosed between the piston 41 and the upper side of the elastomer cushion 5, and accordingly brings about a downward stroke of the plunger 4 and therefore a closing stroke of the valve member 24.

If the position of rest, assumed by the actuating member 26 when the electric current supplied to the piezoelectric element 27 is switched off, should thereupon have been moved relatively far upwardly, the coil compression spring 39 will push the piston 41 a corresponding distance upward as soon as the valve member 24 of the control valve 13 has reached its top end position. When the piston 41 is thus moved, the valve ball 36 lifts from the seat 35 and hydraulic medium overflows from the axial bore 33 of the piston 41 into the space between the piston 41 and the polymeric cushion 5. At the same time, the resilient end surface 34 is deformed. The subsequent actuating stroke of the actuating member 26 in the downwards direction can then be completely transmitted to the upper side of the elastomer cushion 5.

If the actuating member 26 should thereupon assume a position of rest, displaced relatively far downwardly, before the valve member 24 has assumed its opened end position at the constriction 21' of the axial bore 21, the relatively great stress of the spring 25 at first still acts on the plunger 4 and thus on the elastomer cushion 5 which, in turn, exerts a great pressure on the hydraulic medium enclosed between it and the piston 41. Consequently, the medium is displaced through the throttle gap between the piston 41 and the peripheral wall of the portion 2' of the bore 2, through the annular space 42 and through the openings 45 into the axial bore 33 of the piston 41, with the resilient end surface 34 being correspondingly deformed. The volume of the hydraulic medium enclosed between the underside of the piston 41 and the upper side of the elastomer cushion 5 is thus reduced until the valve member 24 has finally reached its end position at the constriction 21'.

In FIG. 4, the hub of the piston 41 is hydraulically supported at the elastic body 5. This is correspondingly true in the opposite direction.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A device employing a displacement principle for stepping up or transmitting at least one of forces and strokes in conjunction with a fuel injection system of an internal combustion engine in which the fuel injection system includes a control valve having a valve member, comprising a piezoelectric element, a displacer on an input side actuatable by the piezoelectric element and having a first cross-section of one amount, a displacer on the output side having a cross-section smaller than the first cross-section, and a displacer working chamber common to the two displacers and filled with a pressure transmission medium formed, at least in the region of one displacer, by an elastomer sealingly closing a side on which said displacer is situated in relation to a side on which the other displacer is situated, wherein the displacer on the output side is drivingly coupled to the valve member of the control valve in the fuel injection system, and the elastomer disposed on the displacer on the output side constitutes a leakproof barrier between a pipe system carrying fuel on the side of the output-side displacer of the elastomer and the piezoelectric element, and fastens the displacer on the output side.

2. The device according to claim 1, wherein the piezoelectric element actuates a piston, a compression spring is clamped between said piston and the elastomer or a part supported thereon, and a first space, filled with hydraulic oil, between said and one of the elastomer and the part supported thereon is connected to a second space disposed in the piston, on one hand, via a nonreturn valve to permit flow only from the second space the first space and, on the other hand, via a throttle path.

3. The device according to claim 2, wherein the first space is disposed directly between the piston and the elastomer.

* * * * *